United States Patent
Rudelic

(10) Patent No.: US 10,146,561 B2
(45) Date of Patent: *Dec. 4, 2018

(54) EXECUTING APPLICATIONS FROM A SEMICONDUCTOR NONVOLATILE MEMORY

(75) Inventor: John C. Rudelic, Folsom, CA (US)

(73) Assignee: Micron Technology, Inc., Boise, ID (US)

(*) Notice: Subject to any disclaimer, the term of this patent is extended or adjusted under 35 U.S.C. 154(b) by 555 days.

This patent is subject to a terminal disclaimer.

(21) Appl. No.: 13/041,541

(22) Filed: Mar. 7, 2011

(65) Prior Publication Data

US 2011/0161572 A1    Jun. 30, 2011

Related U.S. Application Data

(63) Continuation of application No. 10/215,549, filed on Aug. 8, 2002, now Pat. No. 7,904,897.

(51) Int. Cl.
*G06F 9/44* (2018.01)
*G06F 9/445* (2018.01)

(52) U.S. Cl.
CPC ................. *G06F 9/44573* (2013.01)

(58) Field of Classification Search
CPC ............... G06F 9/445; G06F 9/44573
USPC ................. 717/120–122, 168–178
See application file for complete search history.

(56) References Cited

U.S. PATENT DOCUMENTS

| | | | | |
|---|---|---|---|---|
| 5,754,817 A | * | 5/1998 | Wells et al. | 711/203 |
| 5,974,312 A | * | 10/1999 | Hayes et al. | 455/419 |
| 7,904,897 B2 | * | 3/2011 | Rudelic | 717/171 |

OTHER PUBLICATIONS

Microsoft Corporation, "Linear Flash Memory Devices on Microsoft Windows CE 2.1", Apr. 2000, www.msdn.com, 10 pages.*

* cited by examiner

*Primary Examiner* — Ted T. Vo
(74) *Attorney, Agent, or Firm* — Dorsey & Whitney LLP

(57) ABSTRACT

A processor-based device (e.g., a wireless device) may include a processor and a semiconductor nonvolatile memory to directly execute an application (e.g., an execute-in-place application) using an associated database. Within a flash memory, in one embodiment, an executable program may be separately stored in a non-fragmented manner from a resident database that includes program management information for use in an execution that does not involve a random access memory, saving time and resources.

19 Claims, 4 Drawing Sheets

EXECUTING APPLICATIONS FROM A SEMICONDUCTOR NONVOLATILE MEMORY

CROSS-REFERENCE TO RELATED APPLICATIONS

This application is a continuation of U.S. patent application Ser. No. 10/215,549, filed on Aug. 8, 2002 now U.S. Pat. No. 7,904,897.

BACKGROUND

This invention relates generally to semiconductor nonvolatile memories operable with target devices, and more particularly to executing from a semiconductor nonvolatile memory such applications that may have a resident database on a processor-based device.

Many processor-based devices, such as consumer devices for use in portable environments or otherwise, may include a semiconductor nonvolatile memory for erasably and programmably storing information that do not need to be periodically refreshed. One type of commonly available and used semiconductor nonvolatile memory is a flash memory. With the rise of content driven networks, many user applications require a mix of code and data to operate the consumer devices. For instance, a variety of wireless devices including cellular phones include a flash memory to store different data files and resident applications. Likewise, a portable device, e.g., a personal digital assistant (PDA), incorporates a flash memory for storing, among other things, certain operating system files and configurable data. In some situations, a flash memory may allow data found in application programs to be stored and manipulated by a resident file management system. In addition, memory managers included in a target device handle the housekeeping functions of code and data management. Typically, file systems and memory managers in conjunction with the device hardware enable users of such devices to subscribe and receive a variety of ancillary services apart from contributing in basic device operation.

However, application programs and resident data associated with such services and/or basic device operation may need to be managed, e.g., periodically updated within a target device. For application management, a variety of application programs including execute-in-place (XIP) applications may need to be stored and executed in the target device. Typically, to execute an application, an executable form of the application is stored along with a database on a flash memory. Thereafter, the executable form of the application is read for loading, copied to a random access memory (RAM), and reassembled into an executable file that can be executed on the target device. This loading and reassembling of the application in the RAM inevitably introduces operational efficiencies while exhausting precious RAM resources. Moreover, before the application may be executed, a startup time may be consumed to begin a RAM operation, adversely delaying any desired updates at the target device particularly in time critical circumstances.

Thus, there is a continuing need for better ways to manage applications in a target device, especially executing applications from a semiconductor nonvolatile memory that may have a resident database.

DETAILED DESCRIPTION

Figure 1:
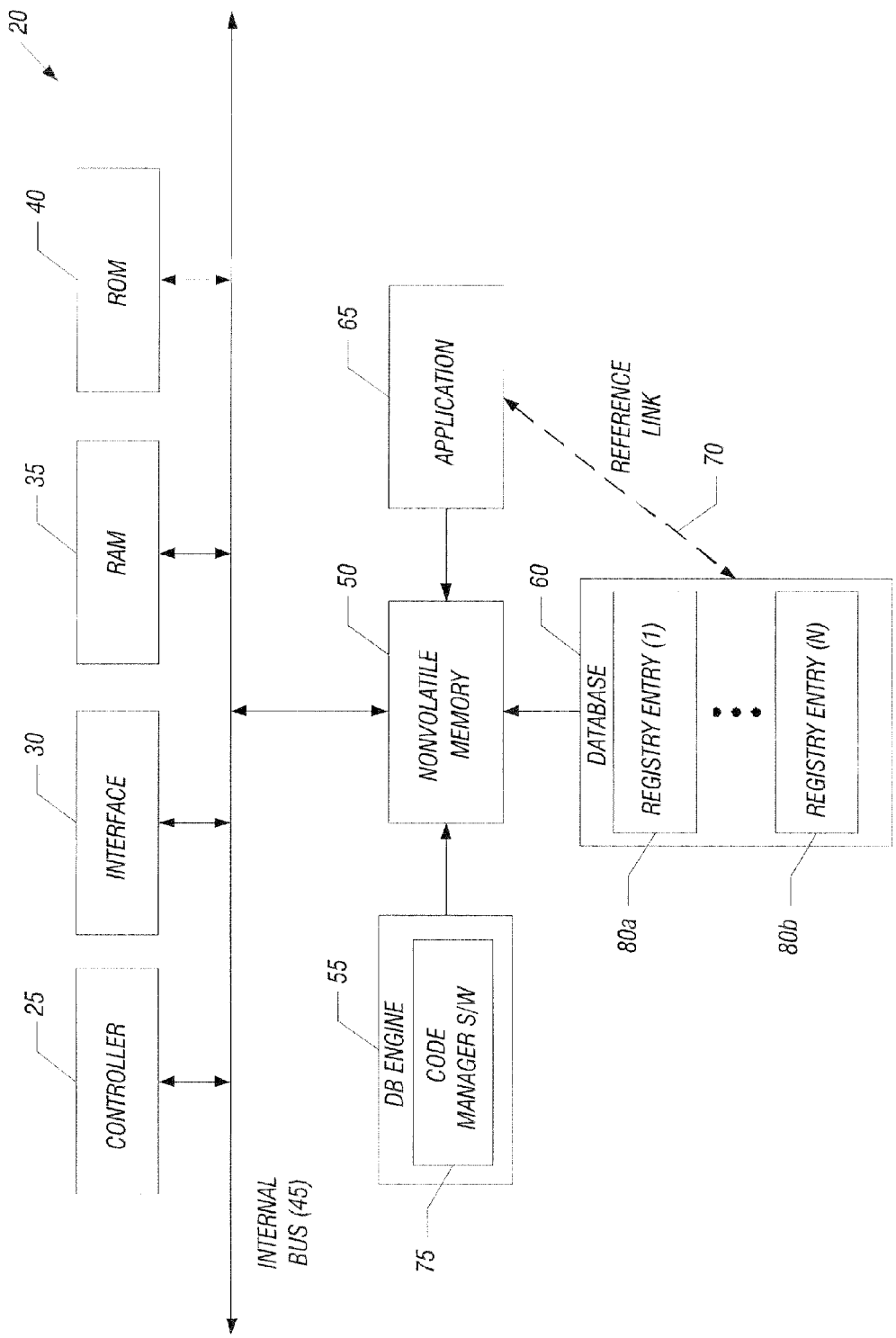
FIG. 1 is a schematic depiction of a processor-based device consistent with one embodiment of the present invention.

A processor-based device 20, as shown in FIG. 1, includes a controller 25 such as a processor that may control an interface 30, permitting a read and a write access according to one embodiment of the present invention. The processor-based device 20 further includes a random access memory (RAM) 35 and a read only memory (ROM) 40 both coupled to the controller 25 via an internal bus 45. While the RAM 35 may be provided to store updateable data or programs, the ROM 40 may be used to store programs that do not require any update during execution. A semiconductor nonvolatile memory 50 is coupled to both the RAM 35 and the ROM 40 by the internal bus 45 in one embodiment in the present invention. Using a database engine 55, the controller 25 may provide direct access to the semiconductor nonvolatile memory 50.

At some point, a database 60 may be loaded in the semiconductor nonvolatile memory 50 in addition to an application 65 according to one embodiment of the present invention. Specifically, the application 65 may be transformed into an executable program which may be stored separately in a non-fragmented manner from the database 60. The database 60 may include program management information for managing the application 65 in one embodiment of the present invention. For execution of the application 65, the database engine 55 may be loaded in the ROM 40 in one case. Furthermore, a reference link 70 may logically link the application 65 with the database 60 within the semiconductor nonvolatile memory 50.

Consistent with one embodiment of the present invention, the database engine 55 may include code manager software 75 for managing the execution of the application 65 from the semiconductor nonvolatile memory 50. Upon initialization, at some point, the code manager software 75 may execute the application 65 based on the program management information stored within the database 60. In one embodiment, the program management information may comprise registry entries 80*a*-80*b*. Registry entries 80*a*-80*b* may incorporate conventional meta-information that is typically used to manage the application 65. Examples of the registry entries 80*a*-80*b* may include registry information, such as an install date, install version, and installer information.

Specifically, the application 65 may be contiguously stored as an executable program in a linear fashion within the semiconductor nonvolatile memory 50 so that the executable program may be directly executed, demand paged, and/or memory mapped in some embodiments of the present invention. This executable program represents the application 65 in an execute-in-place (XIP) application form accordingly. Corresponding to the execute-in-place (XIP) application, a binary representation of the application 65 for the executable program may be used. For managing the application 65, the database 60 may be leveraged by creating an application management database schema, encompassing the registry entries 80a-80b. That is, in one embodiment, the application management schema associates all the registry entries 80a-80b in a structured manner that is useful in database operations. Within the semiconductor nonvolatile memory 50, a database entry for the binary representation of the application 65 being managed may be provided. In this manner, the application 65 may be linked to the registry entries 80a through 80b of the database 60 via the reference link 70.

The semiconductor nonvolatile memory 50 may be a flash memory in some embodiments of the present invention. A flash memory is a type of semiconductor nonvolatile memory, which allows a user to electrically program and erase information therefrom. Using this unique feature of the flash memory, the processor-based device 20 may be desirably managed and updated. That is, in one embodiment, the application 65 and/or the database 60 may be upgraded or reconfigured in response to an indication signaling an update of the flash memory. When such an indication is provided, an appropriate update of the flash memory may be undertaken in the processor-based device 20. In response to the indication, the application 65, i.e., the executable program may be executed from the flash memory using the execute-in-place (XIP) application and the schema according to one embodiment of the present invention.

Although one embodiment is described in conjunction with a flash memory storing the database 60 and the application 65 for execution via the code manager software 75 without using the RAM 35, other suitable nonvolatile solid-state memories may be deployed in some embodiments without deviating from the spirit and scope of the present invention. To mention a few examples, any type of erasable programmable read-only memory (EPROM) that can be conventionally and electrically arranged or programmed may be used in some embodiments of the present invention. Consistent with one embodiment of the present invention, the database engine 55 may be any known database management program capable of maintaining a database, storing one or more database entries. Likewise, the code manager software 75 may correspond to a semiconductor nonvolatile memory file management program capable of interfacing with a file system and/or an operating system.

In operation, the database engine 55 may be loaded into the ROM 40 within the processor-based device 20. For execution, the database engine 55 may be downloaded from ROM 40 into the RAM 35, according to one embodiment of the present invention. Alternatively, the database engine 55 including the code manager software 75 may be preloaded into the semiconductor nonvolatile memory 50. For example, in some embodiments of the present invention, flashware may control the operation of a flash memory, i.e., the semiconductor nonvolatile memory 50.

Figure 2:
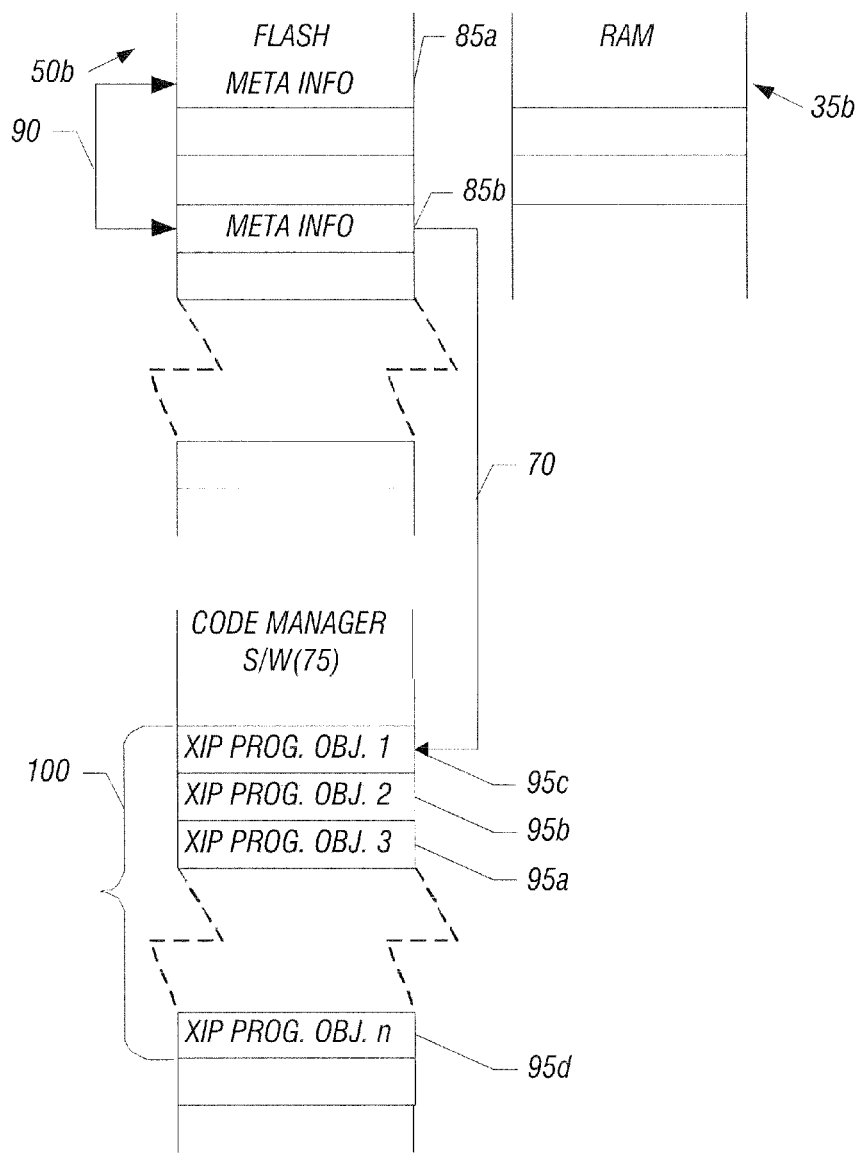
FIG. 2 shows a memory map of a partitioned flash memory that may be located within the processor-based device of FIG. 1 in which an executable-in-place program is stored separately from a database, enabling direct execution of the execute-in-place program corresponding to an application in accordance with one embodiment of the present invention.

A memory map of a partitioned flash memory 50b is shown in FIG. 2 in which the application 65 executes an executable program 100 without using a RAM 35b in accordance with one embodiment of the present invention. The need to copy the application 65, i.e., the corresponding executable program 100 in the RAM 35b, and the subsequent reassembly of the executable program 100 is obviated. Rather than storing the executable program 100 in a segmented manner within the database 60, the executable program 100 may be stored in the flash memory 50b in a non-segmented manner, in one embodiment. Such a non-segmented storage, in one embodiment, entails a continuous, linear storage for an execute-in-place (XIP) application program corresponding to the executable program 100, allowing the application 65 to execute directly from the flash memory 50b. This at least saves the startup time for the RAM 35b and avoids use of the RAM 35b while executing the application 65 in some cases. In operation, the execute-in-place (XIP) application program corresponding to the executable program 100 may be executed from the flash memory using an application management database schema 90 including the meta-information entries 85a-85b according to one embodiment of the present invention.

To store the executable program 100 in a continuous, linear fashion within the flash memory 50b, the code manager software 75 may be utilized in one embodiment. The reference link 70 may associate the code manager software 75 with the database 60, i.e., the meta-information entries 85a-85b, linking the executable program 100 for the application 65. In this way, loading and reassembling of the application 65 into the RAM 35b of the flash memory 50b may be avoided because the XIP program objects 95a-95d are stored in a non-segmented manner, significantly reducing the overhead associated with the execution of the application 65. Using the code manager software 75, the executable program 100 may be executed directly from the flash memory 50b, in some embodiments of the present invention.

Advantageously, a substantially larger amount of meta-information may be provided in the database 60 than otherwise possible by leveraging the application management database schema 90 for meta-information including "registry" type meta-information with the code manager software 75 that stores the application 65 in a contiguous, linear fashion. More specifically, because the meta-information may be independently stored from the code manager software 75 in meta-information entries 85a-85b, a significantly large amount of data may be maintained for the application 65 within the flash memory 50b. In this way, appropriate application management may be provided for the application 65 by leveraging both the meta-information entries 85a-85b of the application management database schema 90 and the reference link 70, linking the executable program 100 to the database 60.

Figure 3:
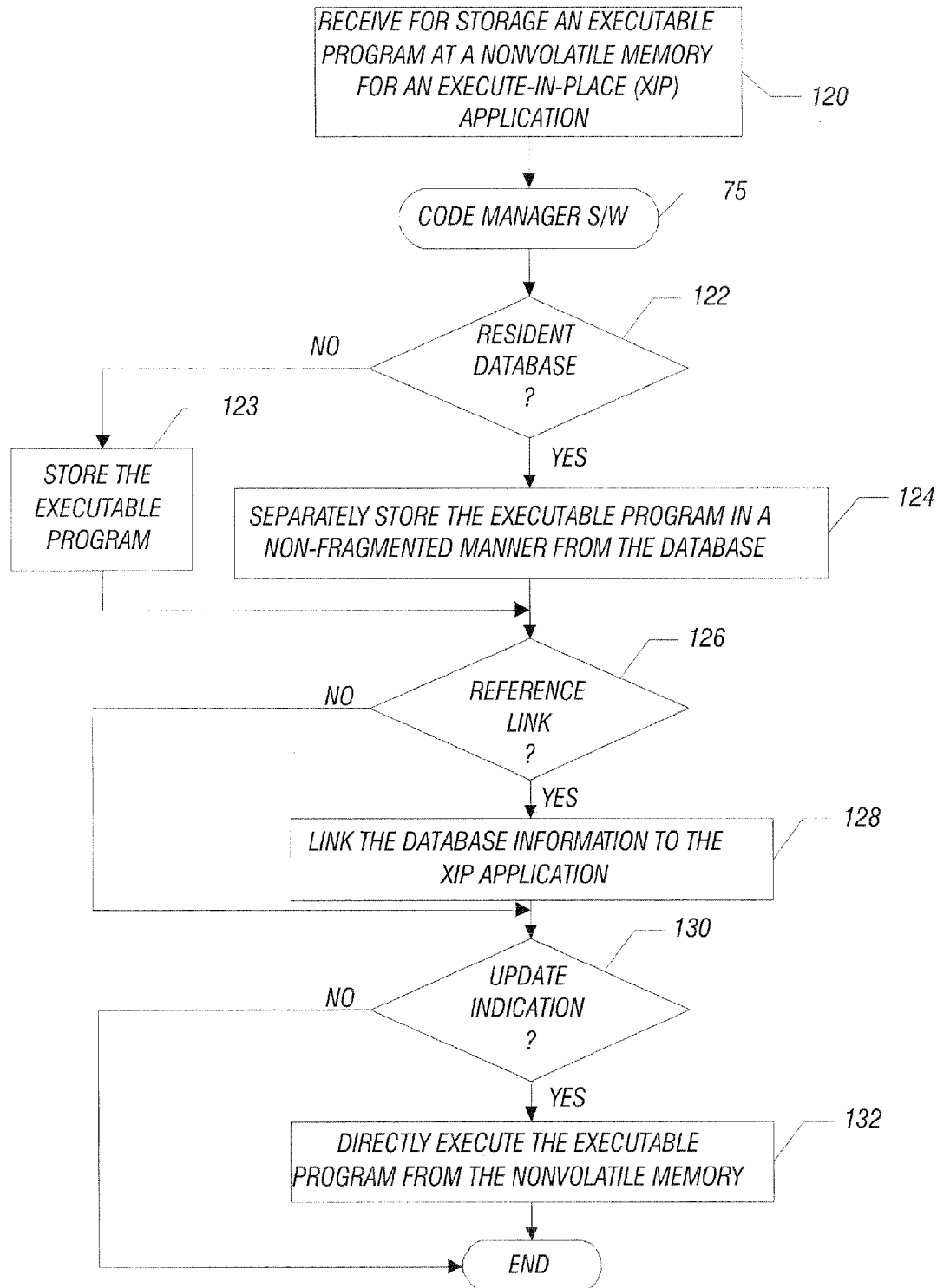
FIG. 3 is a flow chart for software to execute the application from a semiconductor nonvolatile memory included in the processor-based device shown in FIG. 1 according to one embodiment of the present invention.

Referring to FIG. 3, the code manager software 75 may receive for storage the executable program 100 at the flash memory 50b, at block 120. A check at diamond 122 may ascertain whether or not an associated database (e.g., the database 60 shown in FIG. 1) is resident in the processor-based device 20 (FIG. 1). For instance, if the database 60 is detected to be present within the flash memory 50b, the executable program 100 may be stored separately from the database 60 in a non-segmented manner for an associated execute-in-place (XIP) application, such as the application 65 shown in FIG. 1, at block 124. At block 122, if a database is not detected then, the executable program 100 may be stored at an appropriate location within the flash memory 50b, at block 123. If no resident database is detected at the processor-based device 20, the code manager software 75 may terminate in some embodiments of the present invention. Alternatively, a relevant database may be requested.

A check at diamond 126 may determine whether or not a link, such as the reference link 70 is provided between the database 60 and the executable program 100. If so, by using the reference link 70, the database 60 may be logically linked to the application 65 at block 128. At the block 126, however, if such a link is determined to be missing, then, the meta-information entries 85a-85b may not be associated with the XIP program objects 95a-95d of the executable program 100. That is, if at the diamond 126, it may be determined that the reference link 70 is not desirable because either there is no resident database available at the flash memory 50b or a preexisting reference link is detected then, linking of the database 60 and the application 65 may be deemed unnecessary. More particularly, in one embodiment, a pointer may be provided for the reference link 70 from the last meta-information entry 85b to the first XIP program object 95c, storing an initial portion of the executable program 100.

A check at diamond 130 may detect an update indication for the flash memory 50b at a target device, e.g., the processor-based device 20 (FIG. 1). In response to the update indication, at block 132, in one embodiment without using the RAM 35b, the executable program 100 may directly execute from the flash memory 50b. Conversely, if at the diamond 130 no update indication is detected then, the execution of the executable program 100 may be skipped at the processor-based device 20 in some embodiments of the present invention.

To store media content received or sent over a network, the semiconductor nonvolatile memory 50, such as a flash memory may be deployed in some embodiments of the present invention. As an example, a cellular phone may use the flash memory for parameters, data storage and code file management in some situations. Alternatively, a flash memory within a PDA may be used at least for file storage in one embodiment.

Figure 4A:
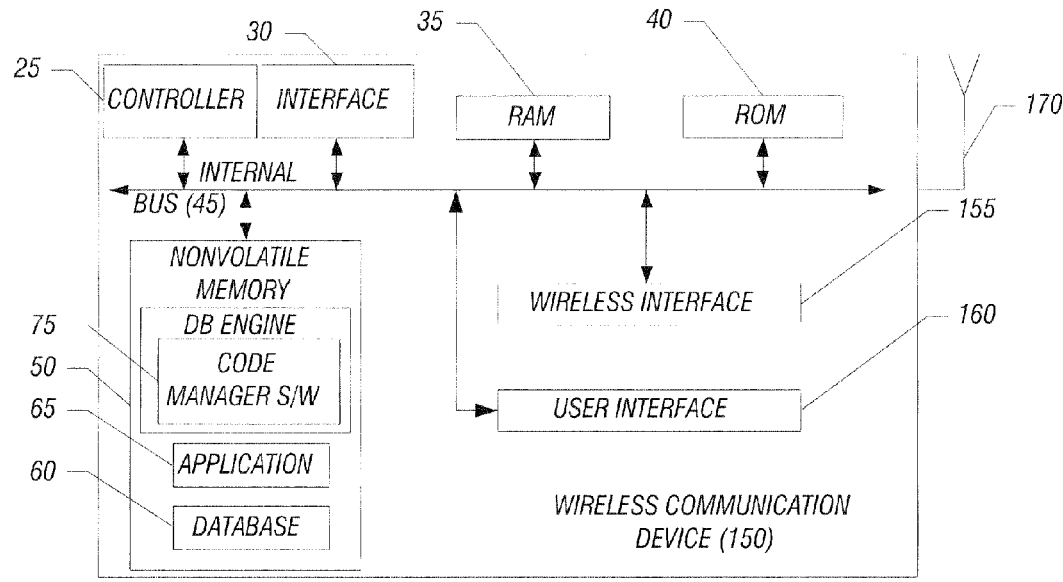
FIG. 4A shows a wireless communication device that uses the software of FIG. 3 consistent with one embodiment of the present invention.

A wireless communication device 150 shown in FIG. 4A may include a wireless interface 155, a user interface 160, and a antenna 170 in addition to the components of the processor-based device 20 (FIG. 1) according to one embodiment of the present invention. Examples of the wireless communication device 150 include mobile devices and/or cellular handsets that may be targeted for providing various subscriber services by database vendors or service providers. To manipulate such services or simply activate or reconfigure a device, update indications may be provided over an air interface to the wireless communication device 150 in one embodiment. In any event, for executing the application 65 from the semiconductor nonvolatile memory 50, the wireless interface 155 may be operably coupled to the antenna 170 via the internal bus 45 to exchange network traffic.

Figure 4B:
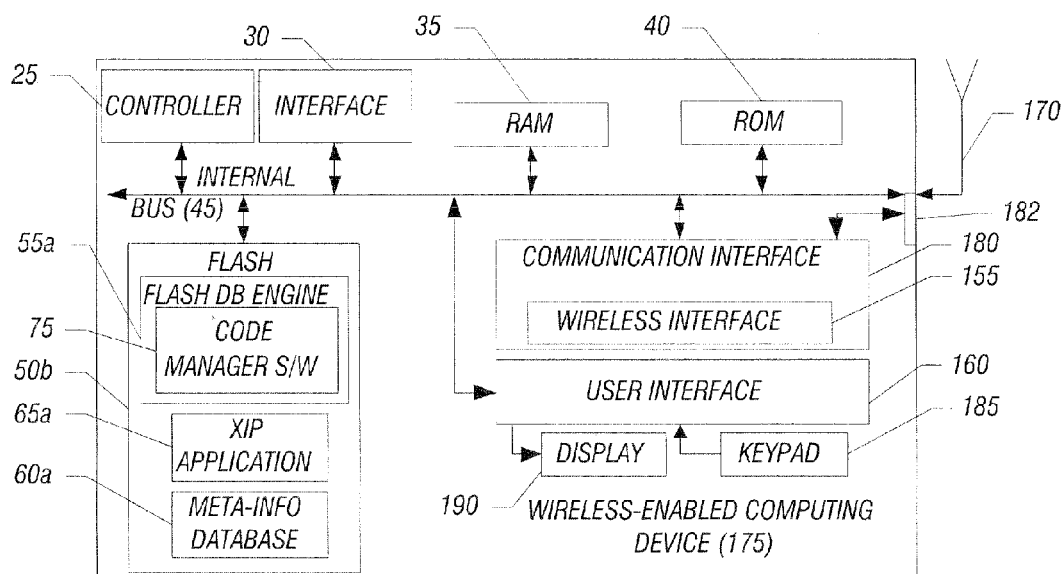
FIG. 4B shows a wireless-enabled computing device that uses the software of FIG. 3 according to another embodiment of the present invention.

Likewise, a wireless-enabled computing device 175 shown in FIG. 4B may include a communication interface 180 operably coupled to a communication port 182 that may communicate information to and from the flash memory 50b in accordance with one embodiment of the present invention. While, a keypad 185 may be coupled to the user interface 160 to input information, a display 190 may output any information either entered into or received from the user interface 160. The wireless interface 155 may be integrated with the communication interface 180 which may receive or send any wireless or wireline data via the communication port 182. For a wireless communication, the antenna 170 may operate according to any suitable one or more network communication protocols capable of wirelessly transmitting and/or receiving voice, video, or data. Likewise, the communication port 182 may be adapted by the communication interface 180 to receive and/or transmit any wireline communications over a network.

Furthermore, the flash memory 50b may include a flash database (DB) engine 55a, incorporating the code manager software 75. An XIP application 65a may be separately stored from a meta-information database 60a within the flash memory 50b in some embodiments of the present invention. By leveraging both the meta-information database 60a and the code manager software 75, the XIP application 65a may be executed from the flash memory 50b, e.g., in response to an update indication received either over the antenna 170 or at the communication port 182. Database vendors or service providers may be able to target the wireless-enabled computing device 175 for providing updates for the VP application 65a and other features using the flash memory 50b and the code manager software 75 in some embodiments of the present invention.

As an example, in one embodiment mobile devices and/or cellular handsets may benefit from such an application management technique based on the code manager software 75. In mobile and handset environments increase in complexity may drive the demand for a full-featured and robust flash memory management system to manage and execute applications including the application 65. In one embodiment, the code manager software 75 may be incorporated in flash management software, providing an ability to manage code, data, and files in the flash memory 50b. The flash management software may be used in real-time embedded applications in some embodiments. Additionally or alternatively, the flash management software in an open architecture may provide support for applets, file transfers, and voice recognition. Using an application program interface (API) that supports storage of parameter data, data streams for multimedia, Java applets and native code for direct execution, and packetized data downloads may be provided in some embodiments of the present invention.

Advantageously, the flash management software may allow a user to store binary code contiguously in the flash memory 50b, which may be run directly without copying the code to the RAM 35b for execution. This code may range from native software compiled strictly for a processor in a system, to downloaded code, which is read and interpreted by a middleware application (such as an applet). The flash management software may allow managing of this code, i.e., write, delete, and modify operations may be applied to a code object in the flash memory 50b via the flash management software application program interface (API) in one embodiment. The flash management software may enable XIP code execution by fetching a code object's location address in the flash memory 50b.

In another embodiment, a virtual small block file manager (VFM) being flash software reference code may provide for disk-like sector and file access to the flash memory 50b, as an example. In addition to data storage capability, VFM file manager may accommodate handling code in the same component, i.e., the flash memory 50b. The VFM file manager, and the underlying virtual small block (VSB) flash media manager as a flash reference code may be used by original equipment manufacturers (OEMs) who need file manager capability, or who need to add flash media management to an existing sector based embedded file manager. The full VFM (VFM and VSB) may be used as the system file manager to the flash memory 50b, or may be adapted to operate under an existing file system/operating system through an API. Moreover, the VFM file manager may handle general file manager functions including but not limited to: file open, file close, file write, file edit, file delete, file seek, tell, reclaim, power-off recovery and cleanup functions In one case, flash storage manager software may combine all semiconductor nonvolatile memory functions into a single chip. A combination of executable code, registry back-up, and file storage may be obtained in a single flash memory, such as in the flash memory 50b. By integrating both executable code and file storage functions into a single flash chip, a system using an operating system (OS) may store both code and data. Working in conjunction with a ROM file system in the OS, a simultaneous access may be provided to separate code and file partitions in the same flash chip. The code may be directly executed, demand paged, or memory mapped in some embodiments of the present invention.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
    a computing device; and
    a non-volatile memory coupled to said computing device, said memory configured to store an executable program in a non-fragmented manner, an associated database that includes registry entries, and a database engine that includes code management software, wherein said executable program, associated database and database engine are stored separately within the non-volatile memory, said computing device configured to execute the program directly from the non-volatile memory based on the code management software being associated with the associated database and linking the executable program to the registry entries included in the associated database, and wherein the program is executed directly from the non-volatile memory without moving the registry entries to a volatile memory.

2. The system of claim 1, said device configured to execute the program based on the program management information in response to an update indication.

3. The system of claim 1, said computing device configured to move the database engine that includes the code management software to the volatile memory.

4. The system of claim 1, said non-volatile memory storing meta information in the program management information of the associated database.

5. The system of claim 1, said non-volatile memory storing an execute-in-place application in one or more objects for the executable program, each one of said one or more objects to hold a portion of the executable program.

6. The system of claim 5, wherein said data base engine is configured to run the execute-in-place application at said non-volatile memory using a schema in one or more objects.

7. The system of claim 6 wherein said data base engine is adapted to store said one or more objects in a binary form at a different location than the program management information of the associated database.

8. The system of claim 1 wherein said non-volatile memory is a flash memory and said system is a wireless communication system.

9. A communication system comprising:
    a wireless-enabled computing device including a controller; and
    a semiconductor nonvolatile memory coupled to said controller and configured to store an executable program in a non-fragmented manner separately from an associated database that includes registry entries and separately from a database engine that includes code management software, wherein the semiconductor nonvolatile memory is configured to associate the code management software with the associated database and to cause the code management software to link the executable program with the registry entries, and further configured to execute the executable program directly from the nonvolatile memory based on the linked registry entries in response to an update indication without moving the registry entries to a volatile memory.

10. The communication system of claim 9 wherein said semiconductor nonvolatile memory comprising:
    meta-information in the registry entries of the associated database;
    an execute-in-place application in one or more objects for the executable program, each of said one or more objects to hold a portion of the executable program; and
    the database engine to run the execute-in-place application at said semiconductor non-volatile memory using a schema and one or more objects.

11. The communication system of claim 9 wherein said database engine is configured to store said one or more objects in a binary format at a different location than the meta-information in the registry entries of the associated database.

12. A method comprising:
    storing an executable program in a non-fragmented manner in a non-volatile memory;
    storing a database including registry information associated with the executable program in the non-volatile memory, wherein the database including the registry information is stored separately from the executable program;
    storing a database engine in the non-volatile memory, wherein the database engine includes code management software;
    associating the database engine with the database including registry information associated with the executable program;
    linking, by the code management software, the executable program with the registry information; and
    executing, by a controller, the executable program directly from the non-volatile memory based on the registry information associated with the executable program without moving the registry information to a volatile memory.

13. The method of aim 12 including storing said program in linear fashion so that it may be directly executed.

14. The method of claim 13 including executing said program in place.

15. The method of claim 12 including upgrading said program in the non-volatile memory responsive to an update indication.

16. The method of claim 12 including using said database engine to store one or more objects in binary form at a different location than said registry information.

17. A method comprising:
    separately storing a program, an associated database of registry information, and a database engine that includes code management software in a non-volatile memory;
    receiving a request to update the program;
    associating, by a controller, the database engine with the associated database;
    linking, by the code management software executed by the controller, the registry information with the program; and executing, by the controller, said program from said memory in response to said request, using information stored in said associated database of registry information without moving the registry information to a volatile memory.

18. The method of claim 17 including storing said program contiguously in said memory.

19. The method of claim 17 wherein the database engine is stored on a read only memory coupled to said non-volatile memory.

* * * * *

UNITED STATES PATENT AND TRADEMARK OFFICE
CERTIFICATE OF CORRECTION

PATENT NO. : 10,146,561 B2
APPLICATION NO. : 13/041541
DATED : December 4, 2018
INVENTOR(S) : John C. Rudelic Page 1 of 1

It is certified that error appears in the above-identified patent and that said Letters Patent is hereby corrected as shown below:

In the Claims

| | Reads | Should Read |
|---|---|---|
| Column 7, Line 26 | "wherein said executable program, associated database and database engine are stored separately within the non-volatile memory," | --wherein said executable program, associated database, and database engine are stored separately within the non-volatile memory,-- |
| Column 8, Line 47 | "The method of aim 12 including storing said program in linear fashion so that it may be directly executed." | --The method of claim 12 including storing said program in linear fashion so that it may be directly executed.-- |

Signed and Sealed this
Twenty-sixth Day of February, 2019

Andrei Iancu
*Director of the United States Patent and Trademark Office*